US008050354B2

United States Patent
Qu

(10) Patent No.: US 8,050,354 B2
(45) Date of Patent: *Nov. 1, 2011

(54) APPARATUS, AND ASSOCIATED METHOD, FOR COMMUNICATING A DATA BLOCK IN A MULTI CARRIER MODULATION COMMUNICATION SCHEME TOGETHER WITH AN IDENTIFICATION SEQUENCE SUPERIMPOSED THEREON

(75) Inventor: Shouxing Qu, Ottawa (CA)

(73) Assignee: Research In Motion Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/982,926

(22) Filed: Dec. 31, 2010

(65) Prior Publication Data
US 2011/0096866 A1 Apr. 28, 2011

Related U.S. Application Data

(63) Continuation of application No. 11/670,548, filed on Feb. 2, 2007, now Pat. No. 7,864,875.

(51) Int. Cl.
*H04L 25/49* (2006.01)
*H04L 27/28* (2006.01)
(52) U.S. Cl. ........................ 375/297; 375/260
(58) Field of Classification Search ............... 375/260, 375/267, 297
See application file for complete search history.

(56) References Cited

U.S. PATENT DOCUMENTS

| 6,925,128 | B2 | 8/2005 | Corral |
| 7,103,097 | B1 | 9/2006 | Duvaut et al. |
| 7,215,701 | B2 | 5/2007 | Sambhwani et al. |
| 7,639,747 | B2 | 12/2009 | Moffatt et al. |
| 7,864,875 | B2 * | 1/2011 | Qu ............................... 375/260 |
| 2004/0008616 | A1 | 1/2004 | Jung et al. |
| 2004/0042538 | A1 | 3/2004 | Yang |
| 2004/0093545 | A1 | 5/2004 | Khandani et al. |
| 2004/0146115 | A1 | 7/2004 | Feng et al. |
| 2005/0089116 | A1 | 4/2005 | Moffatt et al. |
| 2006/0120269 | A1 * | 6/2006 | Kim et al. ................... 370/208 |

FOREIGN PATENT DOCUMENTS

| EP | 1331780 A1 | 7/2003 |
| JP | 11-215092 A | 8/1999 |
| WO | 2004/054193 A2 | 6/2004 |

OTHER PUBLICATIONS

Seung Hee Han and Jae Hong Lee, "An Overview of Peak-To-Average Power Ration Reduction Techniques for Multicarrier Transmission," IEEE Wireless Communication, Apr. 2005, pp. 56-65.
Xianbin Wang, Yiyan Wu, and Jean-Yves Chouinard, "Robust Data Transmission Using the Transmitter Identification Sequences in ATSC DTV Signals," IEEE Trans. On Consumer Electronics, vol. 51, No. 1, pp. 41-47, 2005.

* cited by examiner

*Primary Examiner* — David Lugo

(57) ABSTRACT

Apparatus, and an associated method, for facilitating communication of a data block communicated in an OFDM-based, communication system. Side-information required to be transmitted by many PAPR reduction schemes in OFDM is carried and transmitted by sending orthogonal binary sequences superimposed on the OFDM data sequence carrying the information to be transmitted. In one embodiment, a selected scrambling sequence is multiplied with an input data block to yield a desired Peak-To-Average Power Ratio. An identification sequence one-to-one corresponding to the scrambling sequence is superimposed on the resultant sequence and transmitted together. In the receiving station, the identification sequence is determined through correlation operations. This also determines the scrambling sequence. The effects of both sequences are finally removed from the information-carrying data sequence.

20 Claims, 4 Drawing Sheets

APPARATUS, AND ASSOCIATED METHOD, FOR COMMUNICATING A DATA BLOCK IN A MULTI CARRIER MODULATION COMMUNICATION SCHEME TOGETHER WITH AN IDENTIFICATION SEQUENCE SUPERIMPOSED THEREON

CROSS-REFERENCE TO RELATED APPLICATION

This application is a continuation of, claims benefit of, and incorporates by reference U.S. patent application Ser. No. 11/670,548 titled "Apparatus, And Associated Method, For Communicating A Data Block In A Multi Carrier Modulation Communication Scheme Together With An Identification Sequence Superimposed Thereon", filed on Feb. 2, 2007.

The present invention relates generally to a manner by which to communicate a data block in an OFDM, or other MCM-based system. More particularly, the present invention relates to apparatus, and an associated method, by which to send the data block, altered in a manner to facilitate its communication, together with assistant data for side information to facilitate recovery of the informational content of the data block, once received.

The assistant data, forming, e.g., an identification sequence, is superimposed upon the data block, and does not require separate channel capacity, such as a channel subcarrier, to communicate the assistant data. Channel bandwidth efficiency is improved.

BACKGROUND OF THE INVENTION

The availability of radio communication systems through which to communicate is a necessary aspect for much of modern society. Many varied types of radio communication systems have been developed and used for various purposes. Cellular radio communication systems, for instance, have achieved significant levels of usage. Network infrastructures of cellular communication systems have been installed to encompass significant portions of populated areas of the world. Successive generations of cellular communication systems have been developed, and their network infrastructures deployed and installed. Early-generation cellular communication systems were used primarily for voice communications. Successor-generation systems provide increasingly for data communication services, including multi-media communication services.

A cellular communication system is generally a bandwidth-constrained system. That is to say, the radio-frequency bandwidth allocated to a cellular communication system is limited, and the limited bandwidth sometimes constrains the communication capacity of the system. Other radio communication systems are also similarly and also generally bandwidth constrained. Efforts are therefore made to make efficient use of the allocated bandwidth. And, communication schemes have been developed to make the most efficient possible use of bandwidth allocated to a communication system. For instance, OFDM (Orthogonal Frequency Division Multiplexing) schemes have been proposed and planned for use as part of a new-generation, cellular communication system. In an OFDM communication scheme, sub-carriers are defined. The sub-carriers are mutually orthogonal, or nearly orthogonal. In general, in an OFDM symbol, each subcarrier is independently modulated, often implemented by the inverse discrete Fourier transform (IDFT). In addition, cyclic prefix (CP) is often padded to the transformed data sequence after IDFT. There is a heightened need, in an OFDM-based system, to control power levels of the transmitted signal at which data is communicated. A PAPR (Peak-To-Average Power Ratio) is a power characteristic of the transmitted signal that is of significance in communications in an OFDM-based communication system. In general, a higher PAPR requires the power amplifier (PA) to have a wider linear dynamic range, forces PA to work at a lower average power, which makes the power efficiency lower, costs more electrical energy, reduces battery life, and reduces the service coverage areas.

There is an ongoing need to provide a manner by which to communicate data in an OFDM communication system in which the PAPR of the transmitted signal is of an acceptable level. If, the data that is to be communicated is altered (i.e. processed) in some manner to improve the PAPR, indication of the manner by which the alteration is made often needs to be communicated to the receiving communication station. In many cases such information is needed by the receiving communication station to permit the receiving communication station to make inverse processing for the alteration processing, thereby to facilitate recovery of the informational content of the transmitted data.

One conventional scheme to reduce PAPR, referred to as Partial Transmit Sequence (PTS) scheme, is sometimes utilized. In a Partial Transmit Sequence scheme, for each OFDM symbol of the data that is sent by sending station, additional information also needs to be sent by the sending station to inform the receiving station that receives the communicated data a set of coefficients. Such additional communication, referred to, at times, as side-information (SI), is transmitted, e.g., upon reserved sub-carriers. This need to send separate information on the reserved sub-carriers, or otherwise, is at the expense of bandwidth efficiency. That is to say, bandwidth is required to send the side-information. And, when capacity issues on the reserved sub-carrier, such bandwidth is no longer available for other purposes.

What is needed, therefore, is both a manner by which to place data in a form that leads to improved signal PAPR levels and also a manner by which to provide side information related to the alteration processing of the data into the form leading to the improved PAPR to a receiving station.

It is in light of this background information related to communications in a communication system that utilizes a multi-carrier modulation scheme that the significant improvements of the present invention have evolved.

DETAILED DESCRIPTION

Figure 1:
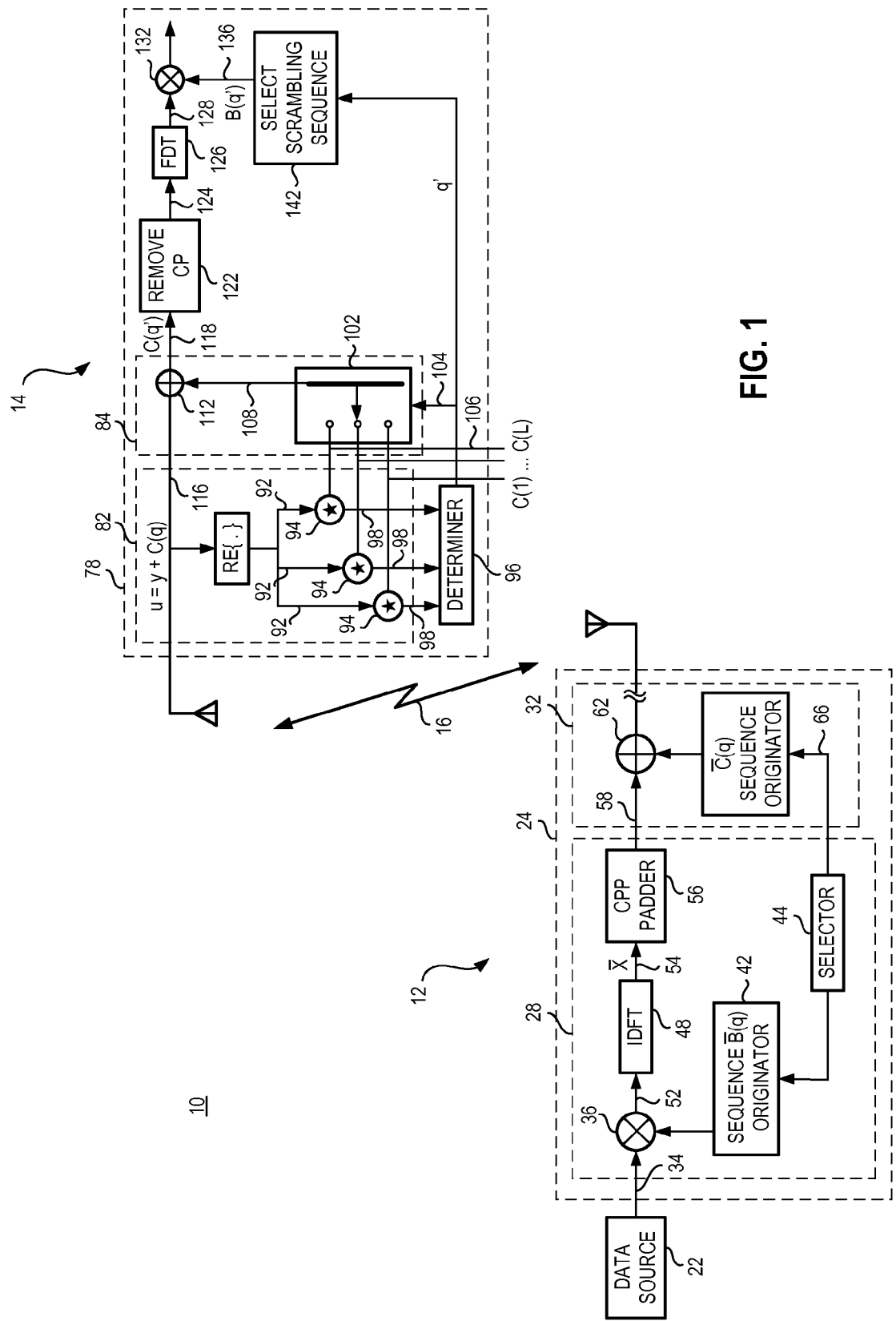
FIG. 1 illustrates a functional block diagram of an exemplary communication system in which an embodiment of the present invention is operable.

The present invention, accordingly, advantageously provides apparatus, and an associated method, by which to communicate a data block in a symbol of an OFDM-based, or other MCM-based, communication system.

Through operation of an embodiment of the present invention, a manner is provided by which to send the data block, altered in a manner to facilitate its communication, together with assistant data for side information, to facilitate recovery of the informational content data block, once received.

In an embodiment of the present invention, the assistant data is superimposed upon the altered data, after IDFT and after optional padding of the cyclic prefix (CP). By superimposing the assistant data upon the processed data block that is to be communicated, the conventional need to use a reserved sub-carrier, or other bandwidth, upon which to communicate the assistant data is obviated. Improved bandwidth efficiency is thereby provided. However, in general the assistant data can be superimposed on the processed data before or after IDFT, and before or after optional padding of the cyclic prefix (CP), with corresponding adjustment of processing order in the receiving station.

In another aspect of the present invention, a data block that is to be communicated by a sending station is combined together with a scrambling sequence that is of characteristics to cause the resultant combination, a product sequence, to lead to a signal PAPR of selected characteristics. The selected characteristics of the PAPR, or other power indicia, ensures that the resultant combination leads to a signal PAPR of an acceptable level or, if not possible, then a PAPR of best-available characteristics. In one implementation, the scrambling sequence consisting of a stream of 1 or −1 and of the same length of the data block is multiplied together with the data block to form a resultant product. If a first product, formed of a first scrambling sequence and the data block does not lead to a PAPR of an acceptable level, an additional iteration, using another scrambling sequence, if available, is performed. Successive iterations are performed, with successive independent scrambling sequences, until a product is formed that leads to an acceptable PAPR or no remaining scrambling sequences are available. If successive iterations are performed and no product leads to an acceptable PAPR, selection is made of a product that leads to a best signal PAPR. Thereby, a product is formed that leads to either an acceptable signal PAPR or a best-available signal PAPR.

In another aspect of the present invention, an identification sequence, acting as the assistant data as mentioned above, is formed that corresponds to the scrambling sequence used to form the selected product sequence. The identification sequence is superimposed upon the transformed product sequence, after ODFT and after the optional padding of CP as a special embodiment, such as by summing together, by a summing element, function, or procedure, to include, as part of the data that is communicated, the identification sequence. Through the superimposition of the identification sequence upon the transformed data that is to be communicated, the data, when communicated, includes the identification sequence that identifies the scrambling sequence used in the formation of the product sequence. A separate signal, such as a signal sent upon one or more sub-carriers is not required. It should be understood that in general the identification sequence can be superimposed prior to or after the IDFT operation, and prior to or after the optional padding of CP, with corresponding adjustment of processing order in the receiving station.

In another aspect of the present invention, a receiving station detects reception of the communicated data block, formed of the transformed product of the data block and the scrambling sequence, with optional CP padded, and upon which the identification sequence is superimposed. Once detection is made, determination is made of the identification sequence superimposed upon the communicated data block. And, once the identification sequence is determined, the identification sequence is removed.

In another aspect of the present invention, determination of the identification sequence is made by way of a correlation function, procedure, or entity. The detected data block is correlated with every possible identification sequence that can be superimposed upon the data block that is communicated. The correlation value that exhibits the highest correlation is considered to be associated with the identification sequence that is superimposed upon the data block. And, the identification sequence is removed from the detected data block, such as by subtracting the identification sequence out of the detected data block.

In another aspect of the present invention, the scrambling sequence is also removed out of the detected data block after DFT. Because of the one-to-one correspondence between the identification sequence and the associated scrambling sequence, determination of the identification sequence also is determinative of the scrambling sequence. The scrambling sequence is removed, for instance, pursuant to a multiplication function, procedure, or entity.

Thereby, a data block is placed into a form to facilitate its communication with a selected PAPR. An identification sequence is superimposed upon the properly processed data block, thereby to provide a receiving station with an indication of the scrambling sequence used to alter an input data block. The superimposition of the identification sequence upon the data block obviates the need for use of one or more separate sub-carriers upon which to convey such side information.

In these and other aspects, therefore, apparatus, and an associated method, is provided for a communication station operable pursuant to a multi-carrier modulation communication scheme. An altered data block generator is configured to generate an altered data block for an accepted PAPR responsive to an input data block. A combiner is configured to combine together an indication of the altered data block with an identification sequence. The identification sequence identifies the parameters or characteristics used in alteration of the input data block by which the input data block is altered, thereby to form the altered data block.

In these, and other, aspects, further apparatus, and method is provided for a communication station operable pursuant to a multi-carrier modulation communication scheme. A detector is configured to detect a receive signal received at the communication station. The received signal includes an indication of a data block, altered by a scrambling sequence and an identifying sequence that identifies the scrambling sequence.

Referring first, therefore, to FIG. 1, portions of a radio communication system, shown generally at 10, include a set of communication stations 12 and 14, interconnected by way of a radio air interface 16. In the exemplary implementation, the communication system 10 forms, an OFDM (Orthogonal Frequency Division Multiplexing)-based communication system. The communication system is, however, more generally representative of any type of communication system in which data is communicated between a set of communication stations. The communication system 10 is, e.g., representative of a 4G (fourth-generation) OFDM-based cellular communication system. While the following description shall describe exemplary operation with respect to this exemplary implementation, it should be understood that the following description is exemplary only and that the communication system is also analogously representative of any of various other communication systems in which data is communicated between a set of communication stations.

Additionally, the communication station 12 shall here be considered a network station, and the communication station 14 shall here be considered a mobile station. And, description of operation shall describe downlink communication, that is, communication in which the network station forms the sending station, and the mobile station forms the receiving station. As a cellular communication system is a two-way system, operation of the communication stations in which uplink communications are carried out, i.e., communication of data from the mobile station to the network station is analogous, and the corresponding parts of the communication stations operated in such uplink communications are analogous.

A data source 22 sources data, here formatted into blocks. Each data is a value taken from an M-ary signal constellation set. Each data block is formed of N data values.

The data sourced by the data source is provided to a transmit chain part of the sending station forming the communication station 12. The transmit chain includes the apparatus 24 of an embodiment of the present invention. The apparatus is formed of functional entities, implementable in any desired manner including, for instance, algorithms executable by processing circuitry or hardware equivalents. Here, the apparatus includes an altered data block generator 28 and a combiner 32.

A data block sourced at the data source 22 is provided, here represented by way of the line 34, to a multiplier 36 that operates to combine the data block with a scrambling sequence, here provided to the multiplier by way of the line 38. A scrambling sequence B(q) is selected to alter the Peak-To-Average Power Ratio (PAPR) of the signal after IDFT when subsequently communicated by the communication station. The scrambling sequence is provided by a scrambling sequence originator 42 formed, e.g., by a sequence generator or a cache at which sequences are stored and available for retrievable for application to the multiplier 36. Selection of the scrambling sequence, in one implementation, is iterative. That is to say, a first scrambling sequence is combined with the data block, and a determination is made as to whether the PAPR of the resultant sequence after IDFT is acceptable. If so, the product sequence is forwarded on to the transmit chain portion of the communication station 12. If, however, the PAPR, or other power indicia, is unacceptable, then another scrambling sequence is provided, combined with the data block, and a determination is made as to whether the new product sequence results in an acceptable PAPR. Successive iterations are performed, if needed, until no more scrambling sequences are available. In such a scenario, a best-available product sequence is used. That is, a product sequence that leads to the minimum PAPR is utilized, and provided to other portions of the transmit chain part of the communication station. Selection of the scrambling sequence is here represented to be made by a selector 44. As indicated, the selector selects a value of q, causing selection of a corresponding scrambling sequence, to be provided and used pursuant to the formation of the product sequence by the multiplier 36. Selection made by the selector is, e.g., made in a manner as just-described to ensure that the product sequence leads to an acceptable, or best-available, PAPR.

The transmit chain portion further includes an IDFT (Inverse Discrete Fourier Transform) operator 48 that is provided, here by way of the line 52, the product sequence formed by the multiplier 36. The operator 48 performs an IDFT upon the product sequence, and the transformed product sequence x is provided, here by way of the line 54, to a Cyclic Prefix Part (CPP) padder 56. The padder 56 adds the cyclic prefix part to the transformed product sequence and the resultant sequence y, is provided here by way of the line 58, to a summing element 62. The summing element 62 forms part of the combiner 32 of the apparatus 24. The combiner is also provided with an identification sequence C(q), here represented by way of the line 66. The line 66 indicates that the identification sequence is selected together with selection of the scrambling sequence. In the exemplary implementation, the identification sequence forms a bipolar identification sequence, one-to-one corresponding to the scrambling sequence, with a sufficient magnitude that is caused, through operation of the summer 62 to be superimposed upon the transformed product sequence, together with the cyclic prefix part added thereto. The identification sequence is of a length of W, and the sequence provided on the line 58 is also of a length of W. Further in the exemplary implementation, each element of the identification sequence takes a value of $\lambda$ or minus $\lambda$ where $\lambda$ is a positive real number. However, it should be known that in general $\lambda$ can also be a complex number. This is to say, the identification sequences are formable, if desired, to be of complex values.

The identification sequences are selected to exhibit good orthogonality. Exemplary identification sequences include Gold-code sequences, Walsh-code sequences, and others that similarly also exhibit good orthogonality.

The identification sequence identifies the scrambling sequence used in the formation of the product sequence. By its superimposition upon the product sequence, the resultant summed sequence, generated here on the line 72, identifies the scrambling sequence used in the product sequence formation. A separate subcarrier upon which to communicate such information is obviated.

The data block, altered by the scrambling sequence, transformed by the IDFT operator, added with the cyclic prefix, and superimposed with the identification sequence, is communicated upon the radio air interface 16 and delivered to the communication station 14, here a mobile station. The receive chain portion of the mobile station includes further apparatus 78 of an embodiment of the present invention. The apparatus 78 is functionally represented, implementable in any desired manner, for instance, algorithms executable by processing circuitry or hardware equivalents. Here, the apparatus includes a detector entity 82 and an identification sequence remover 84.

The detector operates to detect reception at the communication station 14 of the communicated data block. In an ideal system, the communicated data block, u, is identical to that transmitted by the communication station 12. Disregarding any distortion, u=y+C(q). The detector further detects the identification sequence, C(q) that is superimposed upon the transformed product sequence to which the CP is prepended. The detector contains a bank of correlators that correlate the received data, i.e., the communicated data sequence with each of the possible identification sequences that could have been superimposed upon the modified product sequence.

Here, a real-valued operator provides the real-valued parts of the communicated data sequence on the lines 92 that extend to correlators 94, when $\lambda$ is a real number as an example. The correlators 94 correspond in number to the number of possible identification sequences, and corresponding number of scrambling sequences, a selected one of which is possibly superimposed upon the altered data block. A maximum correlation determiner 96 is coupled to receive indications, on the lines 98, of the correlations performed by the correlators 94. The determination made by the determiner is provided to a switch function 102, here by way of the line 104, whose switch position is determinative of which identification sequence, sourced on the lines 106, is passed on the line 108.

The line 108 extends to a negative input of a summing element 112 of the identification sequence remover. The communicated data sequence is provided to a positive input of the summing element, here by way of the line 116. Operation of the summing element subtracts out the identification sequence applied by way of the line 108 from the received data sequence. Thereby, through correlation operations performed by the correlator forming the detector, the identification sequence is determined and then subtracted out of the received data.

The line 118 extends to a Cyclic Prefix Part (CP) remover 122 that operates to remove the cyclic prefix part added to the communicated data sequence. The result, the sequence x' is provided, by way of the line 124, to a Fast Discrete Fourier Transform (FDT) operator 126. Transformed values are provided by way of the line 128 to a multiplier 132. The multiplier 132 multiplies together the transformed values with scrambling sequence values provided by way of the line 136. The line 136 originates at a scrambling sequence selector 142 that, in turn, receives an indication, also by way of the line 104, of the determination made by the determiner 96. The product formed by the multiplier 132 is of data sequence that corresponds to the input data sequence sourced at the data source 22.

Thereby, the correlation operations performed upon the communicated data block determines the identification sequence to permit its subtraction out of the communicated data block. And, determination is further made of the scrambling sequence, and the scrambling sequence is multiplied out of the communicated data block to form a resultant data block that corresponds to the input data block. The data block, through its combination with the scrambling sequence, is placed in a form that leads to an improved PAPR, and the side information of the identification of the scrambling sequence is superimposed upon the data to facilitate re-conversion of the data into original form, once delivered at the receiving station.

Figure 2A:
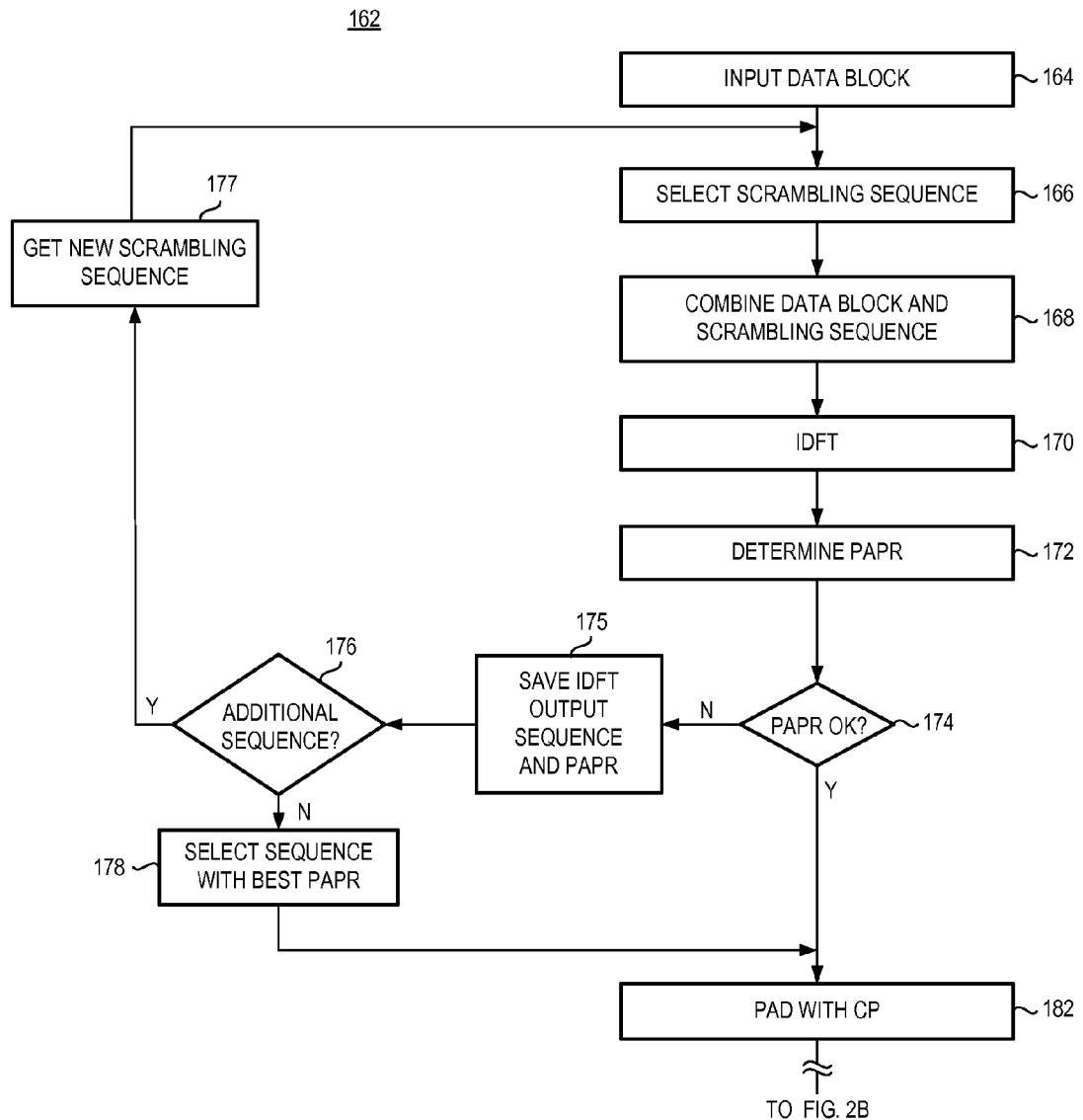
FIGS. 2A-B illustrates a process diagram representative of the process of operation of an embodiment of the present invention.
Figure 2B:
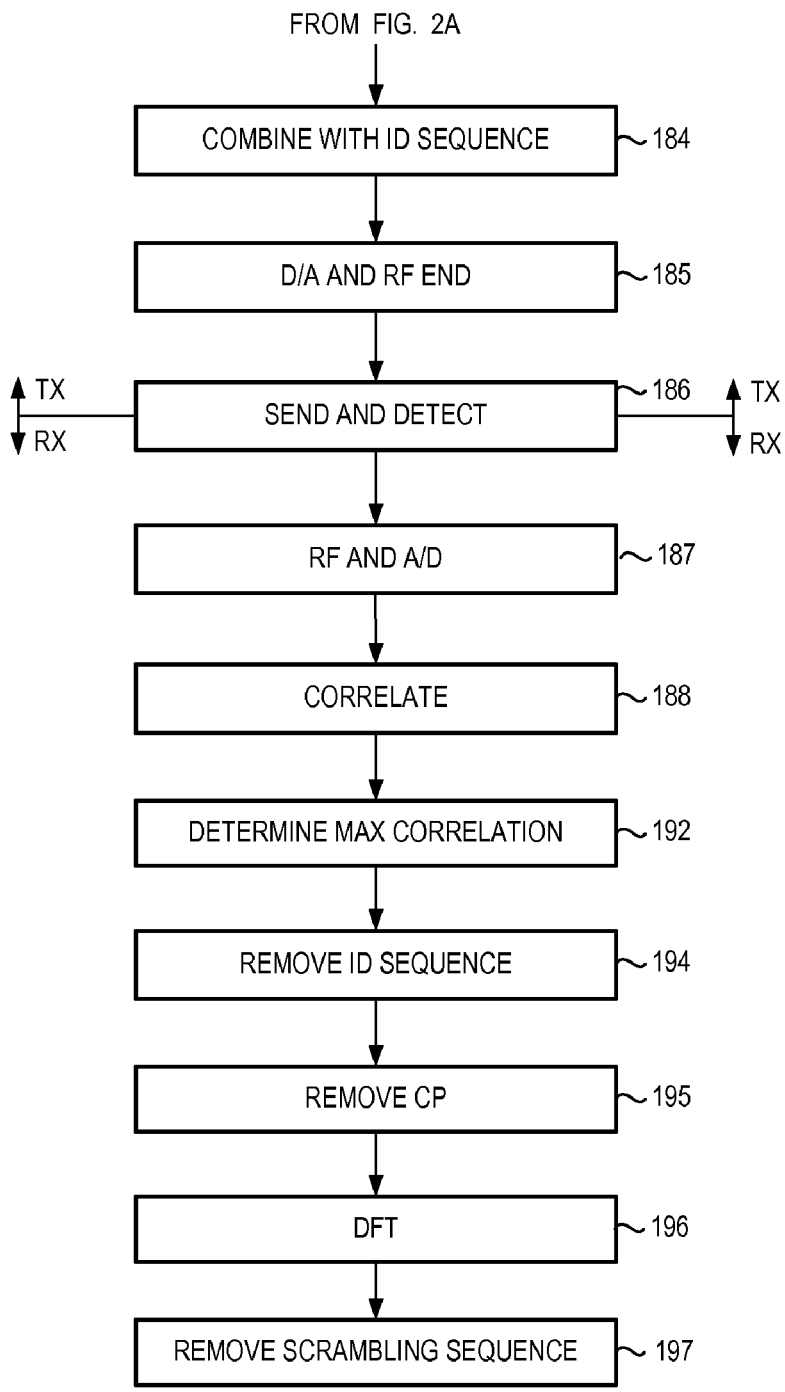

Turning next to FIGS. 2A-B, a process diagram, shown generally at 162, illustrates the process of operation of an embodiment of the present invention. The process provides a manner by which to place an input data block into a form that leads to a selected PAPR level, to form an altered data block therefrom, superimpose information upon the altered data block that identifies the alteration to the input data block, and to recover the informational content of the input data block once communicated to a receiving station.

First, and as indicated by the block 164, an input data block, formed of data symbol is provided. And, as indicated by the block 166, a scrambling sequence is selected. The scrambling sequence and input data block are multiplied together, or otherwise combined, as indicated by the block 168, to form a product sequence. IDFT is performed, indicated at the block 170.

The PAPR (Peak-To-Average Power Ratio) of the product sequence is determined, as indicated by the block 172. Then, a determination is made, indicated by the decision block 174, as to whether the PAPR is acceptable. If not, the no branch is taken to the block 175 and the IDFT output sequence and its PAPR are saved. Then, a path is taken to the decision block 176. At the decision block 176, a further determination is made as to whether an additional scrambling sequence is available to be combined with the input data block. If so, the yes branch is taken to the block 177 and a new scrambling sequence is obtained. Then a path is taken back to the block 166. In the subsequent iteration of the operation at the block 166, the new scrambling sequence obtained at the block 177 becomes the selected scrambling sequence. If no additional scrambling sequence is available at the decision block 176, then the no branch is taken to the block 178, and a selection is made of a transformed product sequence, already-formed and saved, that exhibits a best PAPR level.

The process then proceeds to the block 182, and a cyclic prefix part is prefixed, i.e., prepended, to the transformed product sequence. The yes branch taken from the decision block 174 also extends to the block 182.

Then, and as indicated by the block 184, the transformed product sequence, to which the CP has been added, is combined with an identification sequence by superimposing the identification sequence upon the sequence from block 182. The identification sequence is selected correspondingly at the same time that the scrambling sequence is selected at the block 166.

Then, and as indicated by the block 186, the resultant combination is sent via sending station to a receiving station, and the communicated data block is detected. A correlation procedure, indicated by the block 188, is carried out to calculate correlations between the communicated data block and possible identification sequences that possibly have been superimposed at the process step 184. Responsive to the correlations, a determination is made, indicated by the block 192, of which identification sequence exhibits the greatest correlation with the communicated data block. And, responsive to such determination, as indicated by the block 194, the corresponding identification sequence is removed by a subtraction process, out of the communicated data block. Thereafter, the associated scrambling sequence is also removed after CP is removed and DFT is performed, indicated by the block 197, out of the communicated data block, thereby to recreate the input data block. Subsequent recovery operations thereafter commence.

Figure 3:
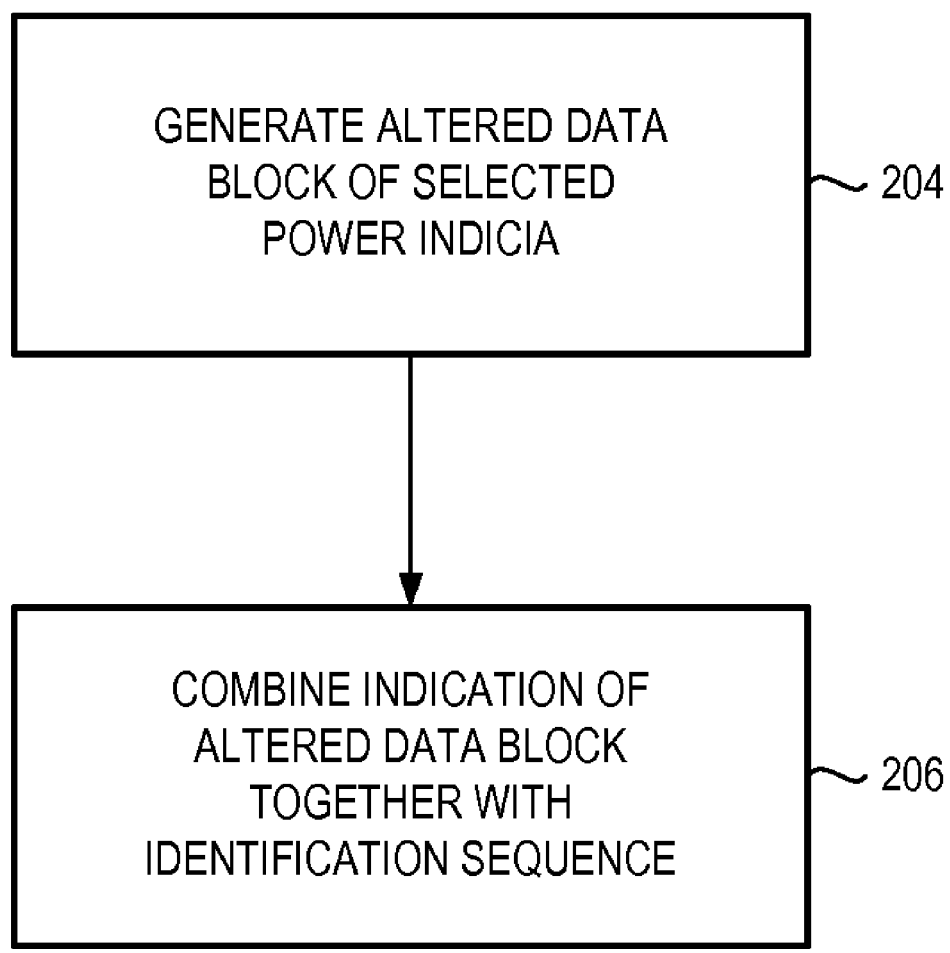
FIG. 3 illustrates a method flow diagram of the method of operation of an embodiment of the present invention.

FIG. 3 illustrates a method flow diagram, shown generally at 202, representative of the method of operation of an embodiment of the present invention. The method facilitates communication in a communication system operable pursuant to a multicarrier modulation communication scheme.

First, and as indicated by the block 204, an altered data block is generated of a selected power indicia responsive to an input data block.

Then, and as indicated by the block 206, an indication of the altered data block is combined together with an identification sequence. The identification sequence identifies alteration of the input data to form the altered data block.

By combining the identification sequence directly with the data of the data block that is to be communicated, a separate sub-carrier or other bandwidth is not required by which to inform a receiving station of the manner by which a data block is altered.

What is claimed is:

1. A method for facilitating communication in a communication system operable pursuant to a Multi Carrier Modulation communication scheme, said method comprising the steps of:
    (a) multiplying an input data block with a scrambling sequence selected from a plurality of scrambling sequences;
    (b) generating an altered data block by at least inverse Fourier transforming said product of said input data block and said selected scrambling sequence;
    (c) determining a transmitted power indicium value for said altered data block;
    (d) determining whether said determined transmit power indicium value is less than a power indicium threshold;
    (e) when said determined power indicium value is less than said power indicium threshold, accepting said altered data block without repeating steps (a)-(d); and (f) adding an identification sequence directly to said accepted altered data block to form a summed sequence, said identification sequence identifying said selected scrambling sequence and being of a length equal to said selected scrambling sequence.

2. The method of claim 1 wherein said determining whether said determined transmit power indicium value is less than said power indicium threshold further comprises saving said determined transmit power indicium value for said altered data block and repeating steps (a), (b), (c), and (d) for another scrambling sequence selected from said plurality of scrambling sequences when said altered data block power indicium exceeds said power indicium threshold.

3. The method of claim 2 wherein said determining whether said determined power indicium value is less than said power indicium threshold further comprises determining a lowest saved determined transmit power indicium value and accepting an altered data block associated with said lowest saved determined transmit power indicium value when none of the plurality of selected sequences yields a determined power indicium value less than a power indicium threshold.

4. The method of claim 1 further comprising the step of transmitting said summed sequence.

5. The method of claim 4 further comprising the steps of detecting reception of said transmitted summed sequence as a receive signal at a receive station and identifying said added identification sequence in said receive signal.

6. The method of claim 5 further comprising the step of removing said added identification sequence, identified during said operation of identifying, from said receive signal.

7. The method of claim 6 further comprising the step of transforming said identification sequence-removed receive signal using a fast discrete Fourier transform operator.

8. The method of claim 1 wherein said determining a transmitted power indicium value for said altered data block further comprises determining a Peak-to-Average-Power Ratio value.

9. The method of claim 1 wherein said generating an altered data block further comprises prepending a cyclic prefix to said inverse Fourier transform of said product.

10. The method of claim 9 further comprising the steps of transmitting said summed sequence, detecting reception of said transmitted summed sequence as a receive signal at a receive station, identifying and removing said added identification sequence subsequent to said receive signal reception detection at the receive station, and removing said cyclic prefix subsequent to said removal of said added identification sequence.

11. Apparatus for a communication station operable pursuant to a Multi Carrier Modulation communication scheme, said apparatus comprising:

an altered data block generator to generate an altered data block having an acceptable transmit power indicium value, said altered data block generator including a multiplier that creates a multiplication product from an input data block and a scrambling sequence selected by a scrambling selector from a plurality of scrambling sequences, an inverse discrete Fourier transformer that inverse Fourier transforms at least said multiplication product to create an altered data block, a transmit power indicium value determiner for said altered data block, and a decider that determines whether said determined transmit power indicium value is less than a power indicium threshold and, when said determined transmit power indicium is less than said power indicium threshold, said decider accepts said altered data block without selecting another scrambling sequence for multiplying with said input data block; and a combiner configured to add together said accepted altered data block directly with an identification sequence that is of a length equal to said accepted altered data block and that identifies the selected scrambling sequence, thereby combining said identification sequence directly with said accepted altered data block to form a summed sequence that, when transmitted, transmits together said accepted altered data block and said identification sequence.

12. The apparatus of claim 11 wherein said scrambling selector further stores said determined transmit power indicium value for said altered data block sequence when said determined transmit power indicium exceeds said power indicium threshold and said multiplier, said inverse discrete Fourier transformer, said transmit power indicium value determiner, and said decider are employed for another scrambling sequence selected by said scrambling selector from said plurality of scrambling sequences.

13. The apparatus of claim 12 wherein said scrambling selector further determines the lowest saved determined transmit indicium value and accepts an altered data block associated with said lowest saved determined transmit indicium value when none of the plurality of selected sequences yields a determined transmit power indicium value less than said power indicium threshold.

14. The apparatus of claim 11 further comprising a radio air interface for transmitting said summed sequence.

15. The apparatus of claim 14 further comprising a receive communication station for detecting reception of said transmitted summed sequence as a receive signal.

16. The apparatus of claim 15 further comprising an added identification sequence determiner that identifies said added identification sequence subsequent to said receive signal reception detection at said receive communication station.

17. The apparatus of claim 16 further comprising an added identification sequence remover, whereby said added identification sequence that is identified by said added identification sequence determiner is removed from said receive signal.

18. The apparatus of claim 11 wherein said transmitted power indicium value further comprises a Peak-to-Average-Power Ratio value.

19. The apparatus of claim 11 further comprises a cyclic prefix padder coupled to said inverse discrete Fourier transformer to prepend a cyclic prefix to said inverse Fourier transform of said product.

20. The apparatus of claim 11 further comprising a radio air interface for transmitting said summed sequence, a receive communication station for detecting reception of said transmitted summed sequence as a receive signal, an added identification sequence determiner that identifies said added identification sequence subsequent to said receive signal reception detection at said receive communication station, an added identification sequence remover that removes said added identification sequence from said receive signal, and a cyclic prefix remover that removes said cyclic prefix subsequent to said removal of said added identification sequence.

* * * * *